Figure 4:
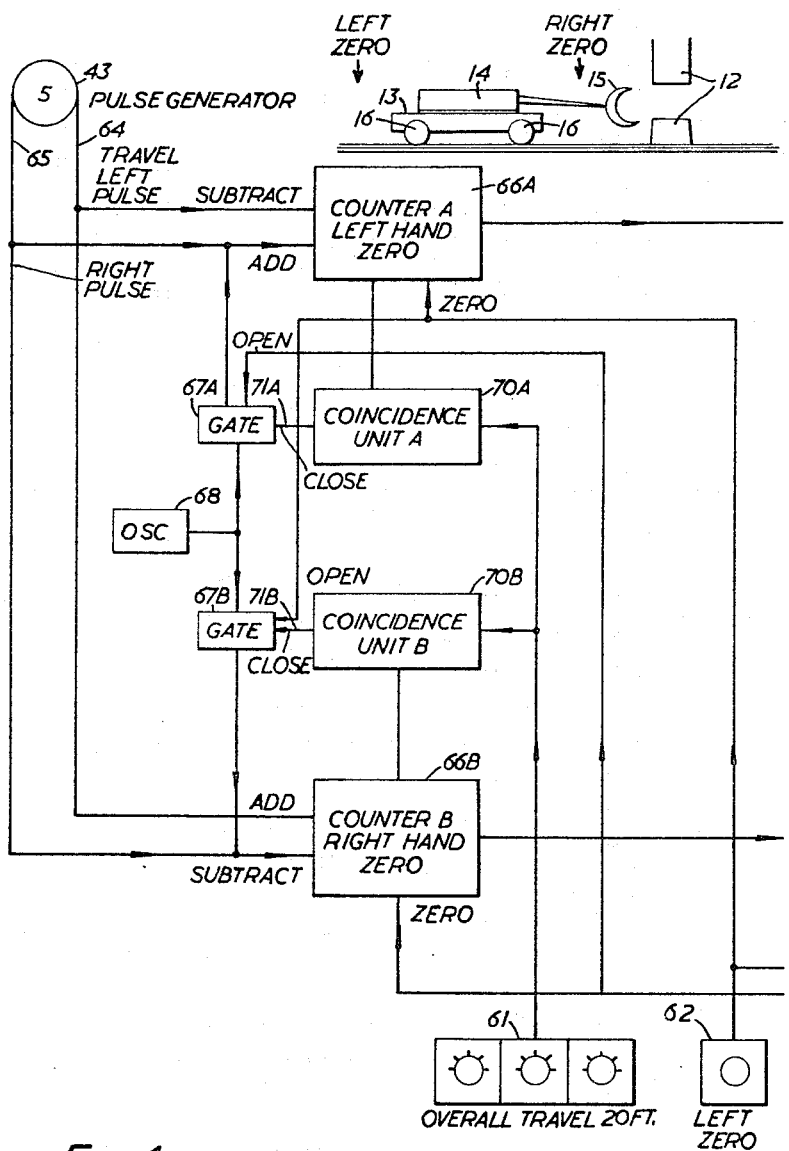
Figure 4A:
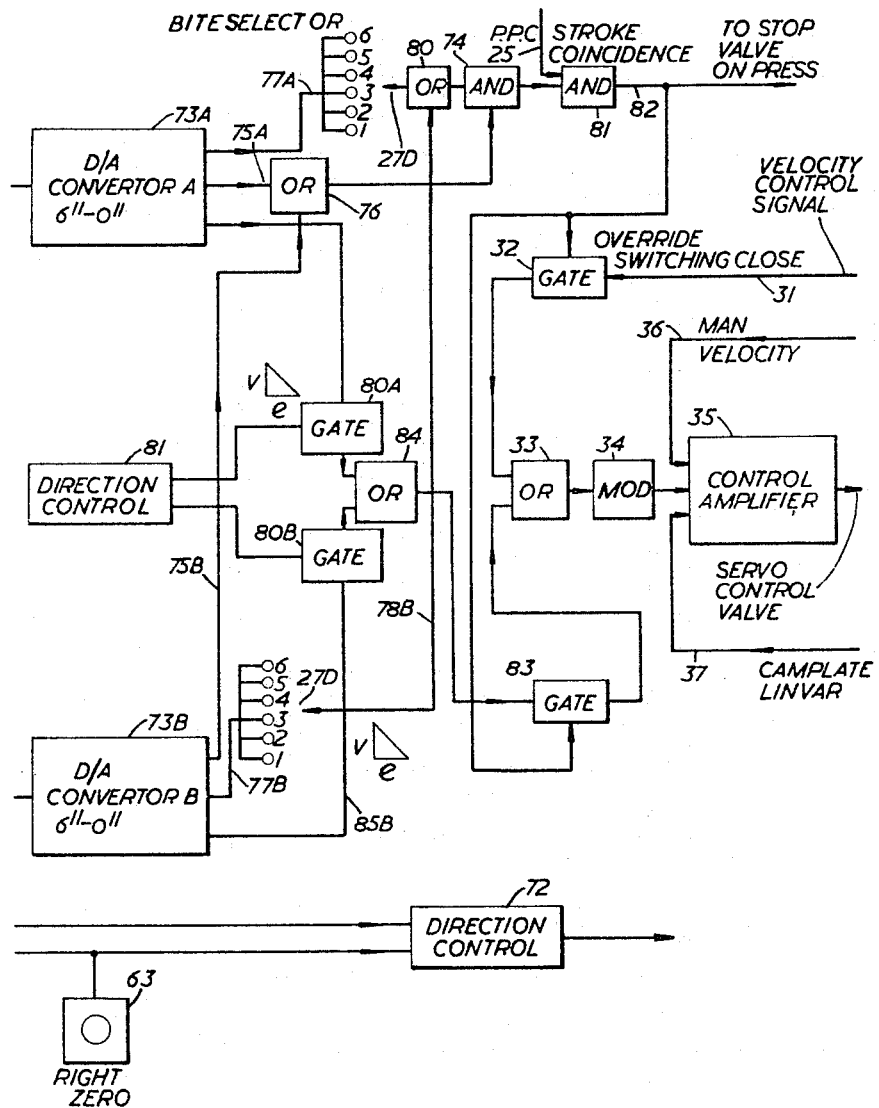

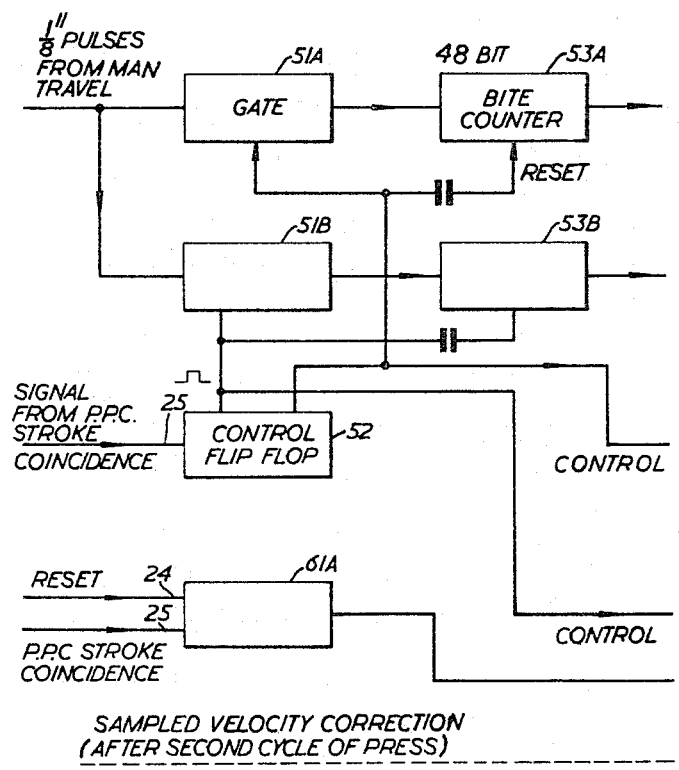
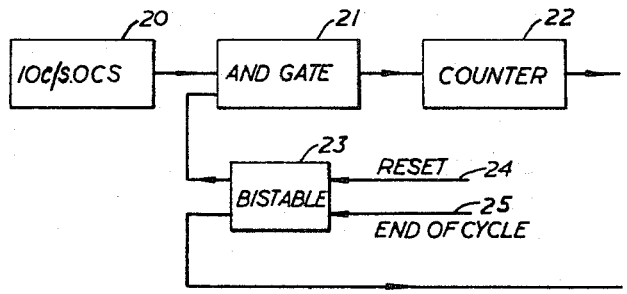
FIG. 1.

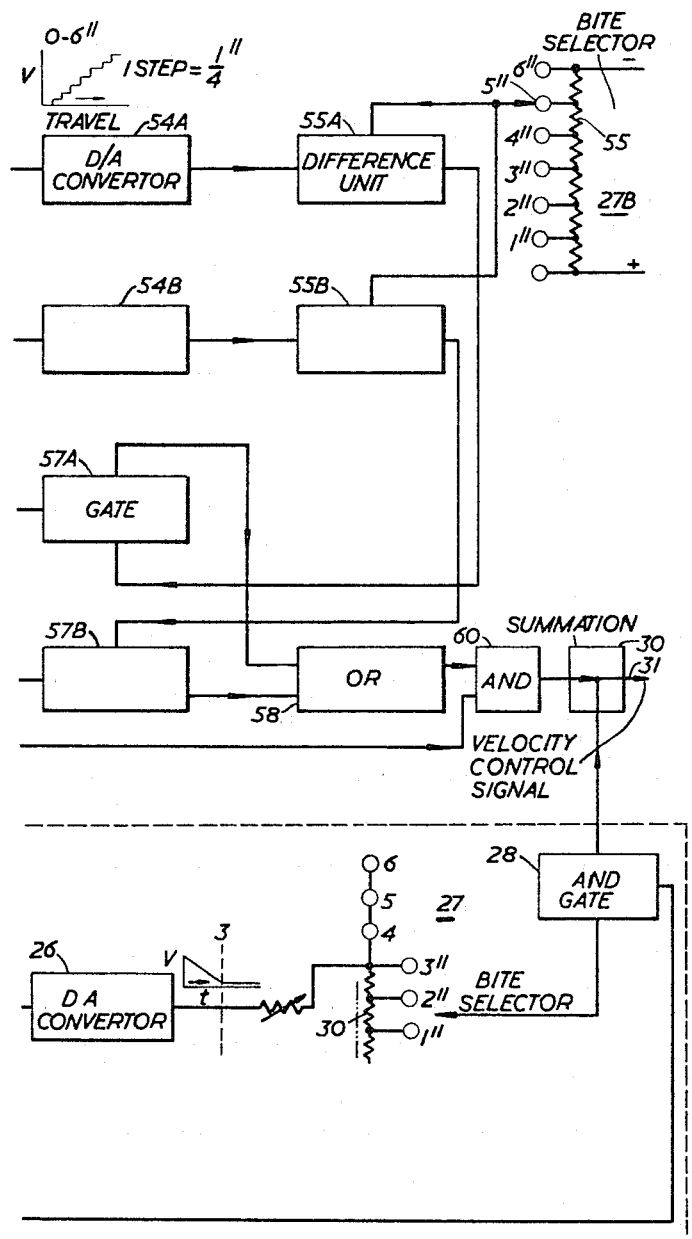
FIG. IA.

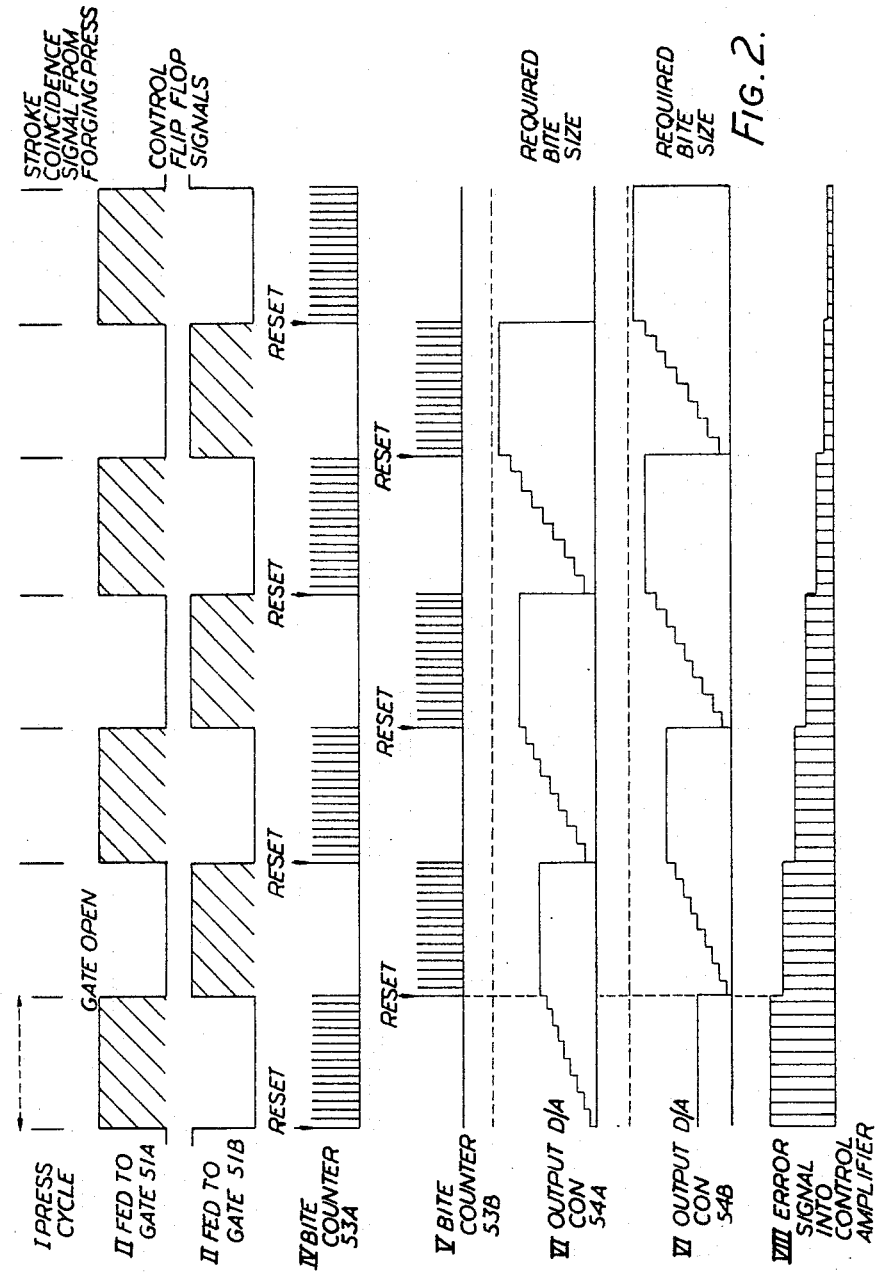

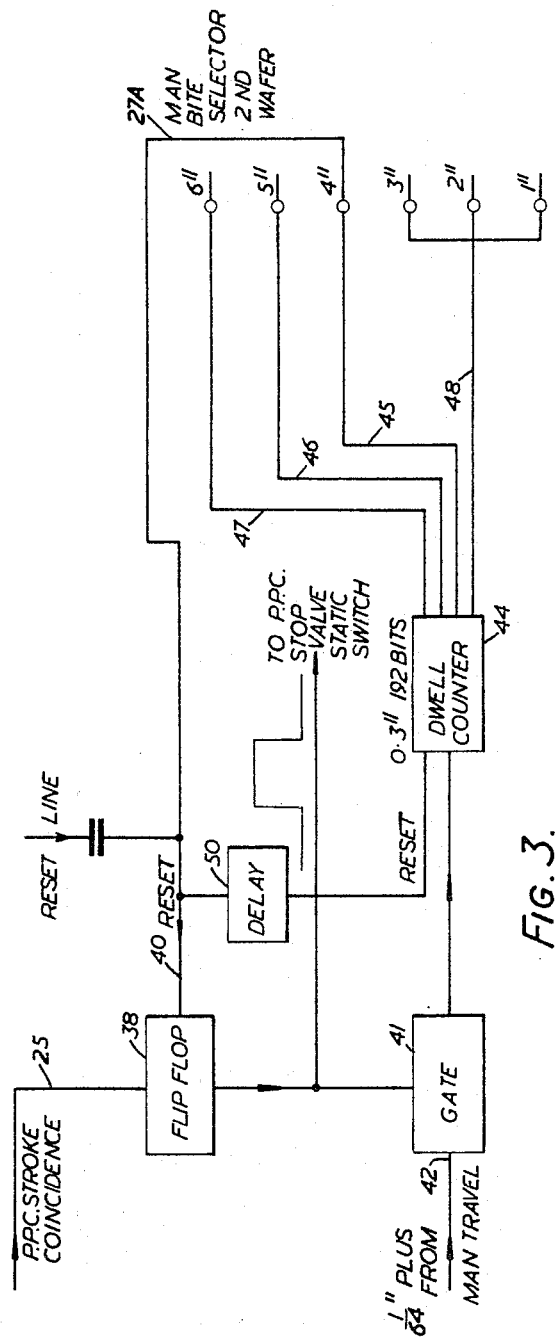

United States Patent Office 3,267,708
Patented August 23, 1966

3,267,708
FORGING PRESSES
Raymond Bernard Sims, Sheffield, and James Arthur Harrison, Chesterfield, England, assignors to Davy and United Engineering Company Limited, Sheffield, England
Filed Aug. 12, 1963, Ser. No. 301,391
Claims priority, application Great Britain, Aug. 29, 1962, 33,078/62
13 Claims. (Cl. 72—6)

This invention relates to forging presses and is particularly concerned with a forging press arranged to forge a workpiece along its length in a succession of bites. In such a press, the workpiece is carried by a manipulator which is moved so that the workpiece is moved lengthwise between successive press cycles by a distance which at least approximates to the bite.

It has already been suggested that the lengthwise movement of the manipulator may be controlled automatically so that in successive cycles the workpiece is shifted relative to the press through the bite distance. It has however been thought necessary to have the manipulator complete its movement while the workpiece is released by the press; this entails high manipulator accelerations and speeds, which are not compatible with accurate positional control, or delays between successive press cycles.

Furthermore, the previous suggestion has entailed presetting of the manipulator speed. This results in the manipulator speed being either too low for the press cycle, so that unnecessary delays between press cycles are introduced, or too high for the press cycle, so that again the delays supplied between successive press cycles are unduly long. In either event, valuable press time is lost.

In the present invention, the workpiece is mounted on the manipulator so that the latter can move lengthwise while the workpiece is gripped by the press; on release of the workpiece by the press, the position of the workpiece relative to the manipulator is restored. By virtue of this arrangement, the lengthwise movement of the manipulator, or at least a substantial proportion thereof, can be perforated during the press cycle, and the delay between successive press cycles is held to a minimum.

In accordance with one aspect of the present invention a method of operating a forging press and manipulator in which the manipulator is moved continuously in the direction of the length of a workpiece, and the workpiece elastically mounted on the manipulator for lengthwise movement relative thereto, forging along its length in a succession of bites, the method including measuring the period of the first pressed cycle and setting the speed of the manipulator for successive cycles, such that the workpiece traverses in the said period either a distance substantially equal to the desired bite, or if the desired bite exceeds a pre-set maximum distance, traverses that distance.

In accordance with another aspect of the invention, a control system for a forging press and manipulator, the manipulator being designed to be moved at a constant speed and to carry a workpiece, elastically mounted thereon for lengthwise movement relative thereto, and for forging along its length in a succession of bites, a control system comprising means operative during a first press cycle, for measuring the period of that cycle and a means for automatically setting the speed of the manipulator in response to said measurement, such that its successive cycles the workpiece traverses in that period either a distance substantially equal to a pre-selected desired bite or if the pre-selected bite exceeds a pre-set maximum distance it reverses that maximum distance and automatically extends three periods of the press cycles.

Each of these aspects of the invention results in the speed of the manipulator being matched at least approximately with the press cycle time, so as to ensure the required transverse movement of the workpiece with the minimum of delay between press cycles.

The invention will be more readily understood by way of example from the following description of a control system for the lengthwise movement of the manipulator of a forging press, reference being made to the accompanying drawings, in which:

FIGURE 1 schematically illustrates the circuit for automatically adjusting the manipulator speed.

FIGURE 2 indicates graphically the operation of the circuit of FIGURE 1,

FIGURE 3 schematically shows the circuit for introducing a delay or dwell between successive press cycles, and FIGURE 4 illustrates the circuit for terminating forging after a pre-set length of the work-piece has been forged.

In FIGURE 4 the forging press is indicated schematically at 12 while the manipulator is shown at 13. The manipulator 13 has a peel 14 with a pair of jaws 15 for gripping the workpiece. As shown, the manipulator 13 is mounted on wheels 16 and the manipulator is controlled remotely in the lengthwise direction relative to the press 12. The movement of the upper, movable, press tool 12 is also automatically and remotely controlled so that it reciprocates between pre-set limits; an automatic control system for controlling the press tool is described in U.S. application Serial No. 420,055.

In the cogging down of an ingot, for example, the ingot is held in the jaws 15 and is cogged down in a succession of press cycles, in each of which the upper press tool 12 descends to a predetermined limit, thereby forging the ingot over the width of the press tool. On the automatic return of the press tool, the ingot is released, where upon the manipulator 13 moves the ingot through a distance equal to the bite of the press and the cycling of the press is repeated until the ingot has been forged along the prescribed proportion of its length.

In the present instance, the peel 14 is mounted on the manipulator 13 by a spring or other mechanism permitting lengthwise movement of the peel 14 relative to the manipulator. With this arrangement, the manipulator 13 may be moved during the time the workpiece is held by the press 12. On release of the workpiece, the peel 14 and the workpiece are restored rapidly to their initial position relative to the manipulator. Because the manipulator 13 is now permitted to move during the entire period of the press cycle, its acceleration is not as great as would otherwise be the case, and the press 12 is not unduly delayed between successive cycles to permit the manipulator to achieve its new position.

Apart from the first press cycle, the manipulator 13 is caused to move continuously at a speed determined by the angle of the camplate of a variable delivery pump supplying the hydraulic drive for the manipulator. This angle and hence the manipulator speed is controlled, as will be described hereinafter, in accordance with the period of the first press cycle and is thereafter adjusted, if the distance travelled by the manipulator during any one cycle departs from the required bite.

A maximum is set on the speed of the manipulator, by the amount which the spring recoil mechanism between the manipulator and the workpiece can absorb while the workpiece is gripped in the press. The value selected in the present instance corresponds to the movement required of a manipulator for a three inch bite when the press is cycling at 180 strokes per minute. This means that, for bites up to and including three inches, the workpiece can be moved to the new position within the cycle period itself. For bites exceeding three inches, the workpiece is moved three inches during the press cycle and the remainder of the bite traversed by the workpiece during a dwell period produced by delaying the upper press member at its upper limit between successive cycles.

In the first cycle of a forging operation, the manipulator 13 is held stationary and the time taken for the upper workpiece to perform the forging cycle and to return to the upper limit is automatically measured by the circuit at the bottom of FIGURE 1. This measurement is used in the circuit to set the camplate angle so that the manipulator will move through the appropriate bite distance during the cycle, provided that the bite is less than three inches; if the bite exceeds this value, the speed of the manipulator is set to the value corresponding to a bite of three inches.

In the second and subsequent cycles, the circuit shown at the top of FIGURE 1 measures the distance traversed by the manipulator during each cycle, and if the measured distance differs from the selected bite, the camplate angle is again adjusted to change the manipulator speed to a value corresponding more exactly to the bite selected. The circuit of FIGURE 3 sets the period (if any) of the dwell of the press at its upper limit, should the bite exceed the maximum value, which in the present instance has been selected at three inches. During the second cycle, the bite is of course appreciably less than that of the first cycle, since the manipulator is stationary during the first cycle and is unable to move through the desired bite distance between the start of the cycle and engagement of the press tools with the workpiece.

When the workpiece is to be forged over its entire length, the press and manipulator cycles are continued until the tail end of the workpiece clears the jaws of the press. On the next cycle, the press will not encounter the resistance of the workpiece and a device sensitive to the pressure of the hydraulic supply to the forge detects the absence of the workpiece and terminates further operation of the press and manipulator.

If, on the other hand, forging is required for a limited length only of the workpiece, the circuit of FIGURE 4 is arranged to terminate cycling when the required length has been forged. This entails measuring the movement of the manipulator and detecting when the remaining lengths to be forged equals the bite employed. Thereafter, the manipulator is controlled to bring it to the position for the final cycle.

Turning now to a detailed consideration of the figures, the lower part of FIGURE 1 represents the circuit for the initial setting of the speed of the manipulator, according to the period of the first press cycle. An oscillator 20, which in this instance produces oscillations at 10 cycles per second, feeds pulses through the AND gate 21 to a pulse counter 22. The AND gate 21 is controlled by a bi-stable device 23, which is reset to open gate 21 by a pulse on line 24 applied when the forge button is depressed to initiate the press operation. The gate 21 is reclosed when the bi-stable device 23 is switched over on the application of a pulse on the line 25, occurring at the end of the cycle; the control system for the press includes a circuit for detecting when the moving press member 12 reaches its upper position and, when this occurs, a pulse is applied to the line 25. The counter 22 is connected to a digital to analogue converter 26 which produces an output voltage inversely proportional to the count in the counter 22. The converter is arranged to give voltage corresponding to maximum manipulator speed for a count corresponding to the minimum press cycle, in this instance 0.3 second, assuming a bite of three inches. Similarly, for a count corresponding to a slower press cycle (in this instance a maximum of three seconds), the converter gives a lower voltage corresponding to the corresponding lower required manipulator speed, again for a bite of three inches. The output of the converter 26 is connected through a bite selector switch 27 to an AND gate 28. The switch positions for bites of three, four, five and six inches are commoned, while the switch positions corresponding to bites of two inches and one inch are connected to a potentiometer 30 such as to give attenuation factors of two thirds and one third respectively. The AND gate 28 is also controlled by the bi-stable device 23 so that gate 28 is opened only when the device 23 is switched over at the end of the press cycle, on the reception of a pulse on line 25. When this occurs, the count in counter 22 corresponds to the period of the first press cycle and the voltage applied through AND gate 28 represents the manipulator speed corresponding to that cycle period. The voltage from AND gate 28 is applied through a summing circuit 30 and, by a line 31 to a normally open AND gate 32 (FIGURE 4), and thence through OR gate 33 and modulator 34 to a control amplifier 35 for a further control valve (not shown) controlling the angle of the pump camplate. The amplifier 35 is also supplied with feedback signals on lines 36, 37 representing the detected manipulator speed and the camplate angle, respectively. It will thus be seen that the speed of the manipulator is automatically set to the period of the first press cycle, and the selected bite, the speed being the same for all selected bites from three to six inches.

As above explained, if the selected bite exceeds three inches, it is necessary to cause the press to dwell at its upper, or open, position to enable the manipulator to complete its movement through the bite distance. The circuit of FIGURE 3 is designed to control the period of this dwell, according to the selected bite. The circuit assumes that, prior to the moving press member 12 reaching its upper limit, at which a signal is given on line 25, the manipulator has moved through three inches and hence the dwell supplied corresponds to the movement of the remainder of the bite. The stop valve static switch of the press position control system, which prevents further movement of the press, is controlled by the flip flop 38, set by a press stroke coincidence signal on line 25 and reset by a pulse on line 40 connected to the second wafer 27A of the bite selector switch. Flip flop 38, when set, operates the stop valve static switch to prevent further movement of the press and opens an AND gate 41, supplied with a pulse on line 42 for each 1/64 inch movement of the manipulator; these pulses may be supplied by the pulse generator 43 (FIGURE 4). When the gate 41 is opened on the press reaching its upper limit, the pulses on line 42 are fed to a counter 44 which produces an output on line 45, 46 or 47 when the count corresponds to manipulator travel of one, two and three inches respectively, i.e. counts of 64, 128 and 192. An output is given on line 48 for zero count. The output on lines 45–48 are applied to line 40 according to the bite selector switch, so that the flip flop 38 is reset and the press position stop switch is opened after the manipulator has travelled through distances of zero, one, two or three inches, according as the selector switch is set at 1–3, 4, 5 or 6 inches respectively. The resetting of flip flop 38 closes gate 41, while the resetting voltage on line 40 is applied through a delay circuit 50 to reset to zero the counter 44, in readiness for the next cycle.

The circuit for detecting the actual movement of the manipulator during each cycle, after the second, and for approximately adjusting the manipulator speed if the movement departs from the selected bite, is illustrated in the upper part of FIGURE 1. This circuit includes two identical channels, the elements of which are identified by the suffices A and B, the arrangement being such that while one channel measures the manipulator travel during the current press cycle, the other channel controls the control amplifier 35 (FIGURE 4) to correct the manipulator speed according to the measurements made during the previous cycle. Pulses from the manipulator pulse generator 43 (FIGURE 4) and corresponding to manipulator travels of 1/8 inch are applied to the AND gates 51A, 51B of the two channels. Gates 51 are oppositely controlled by flip flop 52 which is switched by press control stroke coincidence pulses on line 25, so that the two gates are alternatively opened and closed on successive cycles. The pulses passed by gate 51 are applied to a counter 53, the output from which is applied to a digital to analogue converter 54 giving a step voltage corresponding to the count in the counter 53. The voltage from converter 54 is compared in a difference unit 55 with the voltage from a potentiometer 56 derived from the third wafer 27B of the bite selector switch, according to the selected bite. A difference voltage from the appropriate difference unit 55A, 55B is applied to AND gate 57A or 57B. These gates 57 are controlled by the control flip flop 52 so that, in each channel, when gate 51 is open, gate 57 is closed and vice versa. The output from gate 57A, 57B is applied through OR gate and AND gate 60 to the summation circuit 30 and thence to the control amplifier 35 (FIGURE 4) in order to trim the camplate angle. AND gate 60 is controlled by counter 61, supplied with press control stroke coincidence pulses on line 25. When counter 61 has counted two such pulses, it produces an output to open AND gate 60 and to permit passage of voltages from gates 57 to the control amplifier 35. The counter 61 is reset to zero by a pulse on line 24, on the initiation of a new press operation.

The operation of the circuit is illustrated graphically in FIGURE 2, where on line I there are indicated the pulses on line 25 representing the ends of successive press cycles. Lines II and III represent the two voltages from the control flip flop 52 to the gates 51A, 51B. On alternate press cycles, when gate 51 is open, manipulator travel pulses are passed by that gate as indicated in line IV; the passage of the pulses through gate 51B on alternate press cycles is indicated on line V. In lines VI and VII, the outputs from the converters 54A, 54B are shown, with the required bite size indicated in chain line, it being assumed for the sake of explanation that the manipulator travel during the cycle departs from the required bite size. In view of this departure, the difference units 55A, 55B produce error signals which are applied on alternate cycles by the gates 57A, 57B to the control amplifier 35 (FIGURE 4). The error signals from the difference units 55 is indicated in line VIII of FIGURE 2 and it will be observed that the error signal diminishes decreasingly, due to the trimming of the manipulator speed on successive pulses, due to the error signal itself.

It will be appreciated that, although the two channels of FIGURE 1 are effective from the first press cycle, no trimming control is exerted until the conclusion of the second cycle, due to the operation of the counter 61 and the AND gate 60. However, the error signal resulting from the measurement in the second cycle is applied to trim the manipulator speed during the third cycle and the trimming circuit continues to be effective during each successive cycles to the conclusion of the forging operation.

When the ingot is to be forged over its entire length, the press cycles continue until the tail end of the ingot clears the jaws of the press. On the next cycle, the jaws 15 fail to encounter the resistance of the ingot and a pressure sensitive switch in the hydraulic supply to the press detects this fact and automatically prevents further operation of the press and the manipulator.

FIGURE 4 illustrates the circuit for controlling the movement of the manipulator to achieve forging of the workpiece over a preset, limited length. Forging in this manner can be performed in either direction, i.e. into or away from the press. The overall travel required of the manipulator for the forging operation is first set up on the dials 61a, the manipulator 13 is positioned at either a left zero point or a right zero point according as the manipulator is to move to the right or to the left respectively and the appropriate one of the left zero and right zero buttons 62, 63 is depressed.

The pulse generator 43, as before explained, produces pulses for each unit movement of the manipulator and, as shown in FIGURE 4, these pulses are produced on separate lines 64, 65 according as the direction of the manipulator is towards the left or the right, respectively. The pulses on lines 64, 65 are applied to two terminals 66A, 66B so that the pulses on the lines decrease and increase the counts respectively. Prior to the movement of the manipulator, however, the operation of one of the buttons 62, 63 sets to zero one of the counters 66 and opens a gate 67 corresponding to the other counter; thus, the left zero button 62 sets to zero the counter 66A and opens a gate 67B to permit the passage of pulses from an oscillator 68 to the counter 66B. The count in counter 66B is compared in its coincidence unit 70B with the required travel registered on the dials 61A and, when coincidence occurs, the unit 70B produces an output on line 71B to reclose gate 67B and prevent the passage of further pulses from oscillator 68 to counter 66B. In this way, a count is initially set up in counter 66B corresponding to the required travel. It will be appreciated that if the manipulator is to travel in the opposite direction, the operation of the right zero button 63 will have the effect of setting up in the other counter 66A a count corresponding to the required travel, while counter 66B is set to zero. The operation of one or other of the buttons 62, 63 also operates the direction control circuit 72 to ensure that, when the press operation is initiated, the manipulator moves in the required direction.

Assuming that the left zero button 62 has been operated, the count in counter 66B is decreased progressively by pulses from pulse generator 53 as the manipulator starts to and continues to move during the forging operation. Counter 66B is connected to a digital to analogue converter 73B which produces outputs corresponding to the counts in the corresponding counter. Provided that the count exceeds zero, a gate 74 is held open by the output on line 75B through OR gate 76. A second output 77B of converter 73B is applied to a further wafer 27D of the bite selector switch, such that a pulse appears on the line 78B when the count in counter 66B corresponds to the bite distance. This output on line 78B is applied through OR gate 80 and AND gate 74 to a further AND gate 81. When the next stroke coincidence pulse appears on line 25, AND gate 81 applies a signal on line 82 to stop further movement of the switch and to close gate 32 to prevent further operation of the manipulator speed control circuit.

The output on line 82 also opens an AND gate 83 which is connected to an OR gate 84. A further output line 85B of converter 73B applies a voltage proportional to the count in counter 66B to an AND gate 80B which is held open by a direction control circuit 81, this circuit holding closed the corresponding gate 80A of the converter 73A. The control amplifier 35 is thus controlled by the decreasing count in the counter 66B so that the manipulator is caused to come to rest when the counter reaches zero, which occurs when the manipulator has travelled through the distance set up on the dials 61A. When this occurs, the count in counter 66B falls to zero, the output of converter 73B on line 75B disappears and AND gate 74 closes, cutting off the signal on line 82 and permitting a further reciprocation of the press. This reciprocation of the press concludes the forging through the final distance.

It will be appreciated that although the description has been limited to control of the movement of the manipulator 13 towards the right, the control for movement in the opposite direction, subsequent to the operation of the right zero button 63 is exactly similar, the counter 66A being supplied with similar components 73A, 80A as those for the counter 66B.

We claim:
1. A method of operating a forging press and manipulator in which the manipulator is moved continuously in the direction of the length of a workpiece, and the workpiece is elastically mounted on the manipulator for lengthwise movement relative thereto, and for forging along its length in a succession of bites, the method including measuring the period of the first press cycle and setting the speed of the manipulator for successive cycles, such that the workpiece in the said period either traverses a distance substantially equal to the desired bite, or, if the desired bite exceeds a pre-set maximum distance, traverses that pre-set distance.

2. A method according to claim 1 in which the manipulator is maintained stationary during the first cycle of the press.

3. A method according to claim 1 which, if the desired bite exceeds the pre-set maximum distance, includes automatically extending that period of the press cycle in which the workpiece is free of the tool, such that in the extended period of the press cycle the manipulator moving at said selected speed traverses the remaining portion of the desired bite distance.

4. A method according to claim 1 which includes automatically detecting the distance travelled by the manipulator during successive cycles of the press and if the distance travelled departs from the desired bite distance, automatically correcting the speed of the manipulator.

5. A control system for a forging press and manipulator, the manipulator being designed to carry a workpiece elastically mounted thereon for lengthwise movement relative thereto, and for forging along its length in a succession of bites, the control system comprising means operative during a first press cycle, for measuring the period of that cycle and means for automatically setting the speed of the manipulator in response to said measuring means, such that in successive cycles the workpiece traverses in that period either a distance substantially equal to a pre-selected desired bite or if the pre-selected bite exceeds a preset maximum distance it traverses that maximum distance and automatically extends the free period of the press cycle.

6. A control system according to claim 5 which automatically extends said free period such that in the extended periods of the press cycle the manipulator moving at the preset speed traverses the remaining portions of the desired bite distances.

7. A control system according to claim 6 in which the free periods of the press cycles are extended by holding the press stationary in its upper position.

8. A control system according to claim 7 including means for measuring the distance travelled by the manipulator while the press is held stationary, and means for re-initiating press movement when the manipulator has travelled a distance equal to the difference between the desired bite distance and the preselected maximum distance.

9. A control system according to claim 5 including means for automatically detecting the distance travelled by the manipulator during successive cycles of the press and if the distance departs from the desired bite automatically correcting the speed of the manipulator.

10. A control system according to claim 5 including means for stopping the press when the workpiece has passed out of the press.

11. A control system according to claim 10 in which the means for stopping the press comprise means sensitive to the pressure of the hydraulic supply to the press to detect the absence of the workpiece.

12. A control system according to claim 5 including means for controlling the manipulator such that only a preselected limited length of the workpiece is forged.

13. A control system according to claim 12 in which the means for controlling the manipulator includes means for measuring the movement of the manipulator.

References Cited by the Examiner
UNITED STATES PATENTS

| | | | |
|---|---|---|---|
| 2,864,271 | 12/1958 | Kendall | 214—147 |
| 3,167,978 | 2/1965 | Wistreich | 72—421 |

CHARLES W. LANHAM, *Primary Examiner.*

G. P. CROSBY, *Assistant Examiner.*